(12) United States Patent
Fujita et al.

(10) Patent No.: US 7,407,043 B2
(45) Date of Patent: Aug. 5, 2008

(54) DISK BRAKE

(75) Inventors: Masayuki Fujita, Saitama (JP); Koushi Nakamura, Saitama (JP); Hidetoshi Toyoda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/934,410

(22) Filed: Sep. 7, 2004

(65) Prior Publication Data

US 2005/0067231 A1 Mar. 31, 2005

(30) Foreign Application Priority Data

Sep. 9, 2003 (JP) ............................. 2003-317549

(51) Int. Cl.
*F16D 55/00* (2006.01)
*B60T 1/06* (2006.01)

(52) U.S. Cl. ............... 188/73.31; 188/18 A; 188/218 R (58) Field of Classification Search ............. 188/73.31, 188/73.32, 73.35, 18 A, 218 R, 73.42–73.44
See application file for complete search history.

(56) References Cited

U.S. PATENT DOCUMENTS

| 3,464,523 A | * | 9/1969 | Machek | 188/73.43 |
| 3,905,455 A | * | 9/1975 | Martins | 188/73.43 |
| 5,697,475 A | * | 12/1997 | Le Deit et al. | 188/72.9 |
| 6,250,439 B1 | * | 6/2001 | Matsuzaki | 188/73.31 |
| 6,336,526 B1 | | 1/2002 | Chou | |

FOREIGN PATENT DOCUMENTS

| EP | 0 971 144 A2 | | 1/2000 |
| JP | 8284910 A | * | 11/1996 |
| JP | 200043777 A | * | 2/2000 |
| JP | 2003-65369 A | | 3/2003 |
| JP | 2003-65369 A | | 3/2003 |

\* cited by examiner

*Primary Examiner*—Melody M Burch
(74) *Attorney, Agent, or Firm*—Birch, Stewart, Kolasch & Birch, LLP (57) ABSTRACT

A front disk brake includes a brake caliper having a pair of caliper side mount portions, and a caliper bracket having a pair of bracket side mount portions. The brake caliper includes an oblong-shared lower-side counterbore and a circular-shaped upper-side counterbore, the lower-side counterbore being oblong sectional shaped in the arrangement direction of the lower-side counterbore and the upper-side counterbore paired therewith. The caliper bracket includes lower-side and upper side circular-shaped counterbores which are opposed, respectively, to the counterbores of the brake caliper. The brake caliper is fixed to the caliper bracket by mounting fastening bolts in bolt passing holes and screw holes formed respectively in the mount portions. The bolt passing holes and the screw holes are provided at their portions on the sides of opposed surfaces with counterbores in which collar members are to be fitted.

26 Claims, 4 Drawing Sheets

DISK BRAKE

CROSS-REFERENCE TO RELATED APPLICATIONS

This nonprovisional application is related to Patent Application No. 2003-317549, filed in Japan on Sep. 9, 2003, the entirety of which is incorporated herein by reference.

BACKGROUND OF THE INVENTION

1. Field of the Invention

The present invention relates to a disk brake for use in a vehicle such as a motorcycle.

2. Description of Background Art

Conventionally, disk brakes used in vehicles generally have a structure in which a brake caliper is provided with a pair of caliper side mount portions, while a vehicle body side support portion is provided with a pair of support portion side mount portions. Opposed surfaces of the mount portions are set in abutting relationship. Fastening bolts are mounted in bolt mount holes formed respectively in the mount portions. Accordingly, the brake caliper is fixed to the vehicle body side support portion. Among the disk brakes of this type, there is a disk brake in which a collar member is disposed in portions, on the opposed surface sides, of bolt mount holes in each abutting set of the caliper side mount portion and the support portion side mount portion, in such a manner that the collar member extends from one to the other of the portions. Therefore, the collar members achieve positioning of the brake caliper in the direction along the opposed surfaces, and positioning of the brake caliper in the direction orthogonal to the opposed surfaces is achieved by the mutual abutting of the opposed surfaces (see, for example, Japanese Patent Laid-open No. 2003-65369).

In order to fix the brake caliper accurately relative to the vehicle body side support portion, the tolerance of the inter-axial distance of each pair of bolt mount holes is in some cases set to be smaller than the general tolerance, since it is desirable to minimize chattering of the collar members. This is important for preventing the brake caliper from deviating in the direction orthogonal to the plane of the brake disk, in the radial mount type disk brake in which each of the bolt mount holes is provided in parallel to the radial direction of the brake disk. Thus, for efficiently manufacturing the brake caliper and the vehicle body side support portion, there is a demand for a disk brake so configured that the tolerance of the inter-axial distance of the bolt mount holes can be the general tolerance.

SUMMARY OF THE INVENTION

Accordingly, the present invention aims at providing a disk brake, which makes it possible to efficiently manufacture a brake caliper and a vehicle body side support portion while maintaining positioning accuracy of the brake caliper.

As a means for solving the above-mentioned problems, an embodiment of the present invention provides a disk brake (e.g., a front disk brake 26 in the embodiment) including a brake caliper (e.g., a brake caliper 24 in the embodiment) having pistons (e.g., pistons PI in the embodiment) and brake pads (e.g., brake pads PA in the embodiment) for pressing a brake disk (e.g., a brake disk 25 in the embodiment). In addition, a vehicle body side support portion (e.g., a caliper bracket 42 in the embodiment) is provided on the vehicle body side for supporting the brake caliper. The brake caliper is provided with a pair of caliper side mount portions (e.g., caliper side mount portions 48, 49 in the embodiment). The vehicle body side support portion is provided with a pair of support portion side mount portions (e.g., bracket side mount portions 52, 53 in the embodiment) corresponding to the caliper side mount portions. Opposed surfaces of the mount portions (e.g., a caliper side opposed surface 54 and a bracket side opposed surface 55 in the embodiment) abut each other. Furthermore, fastening bolts (e.g., fastening bolts 40, 41 in the embodiment) are mounted in mount holes (e.g., bolt passing holes 46, 47, and screw holes 50, 51 in the embodiment) formed in the mount portions. Accordingly, the brake caliper is fixed to the vehicle body side support portion. Furthermore, each of the mount holes is provided with a counterbore (e.g., each of upper-side and lower-side counterbores 56, 57, 58, 59 in the embodiment) at its portion on the opposed surface side. A collar member (e.g., each of collar members 60, 61 in the embodiment) extending from one to the other of each opposed set of the counterbores is fitted in the opposed set of the counterbores. In addition, at least one of the counterbores is formed in an oblong sectional shape elongate along the arrangement direction of itself and the counterbore paired therewith.

With this configuration, at the time of mounting the brake caliper to the vehicle body side support portion, the brake caliper is positioned in the direction orthogonal to the plane of the brake disk by only fitting the collar members in the upper-side and lower-side counterbores. Furthermore, the disk caliper is positioned in the radial direction of the brake disk by mutual abutting of the bracket side opposed surfaces and the caliper side opposed surfaces.

In addition, even when an error is generated in the inter-axial distance (the distance along the arrangement direction) of the two mount holes, the error can be absorbed by the counterbore formed in an oblong sectional shape. Therefore, the mounting of the brake caliper is not hampered and the positioning accuracy of the brake caliper can be maintained.

According to another embodiment of the present invention, the positioning of the brake caliper in the direction orthogonal to the plane of the brake disk is particularly important in the case of the so-called radial mount type disk brake in which each of the fastening bolts is disposed in parallel to the radial direction of the brake disk.

According to a further embodiment of the present invention, the counterbores provided in the pair of the caliper side mount portions and the counterbores provided in the pair of bracket side mount portions are respectively arranged in the rotating direction of the brake disk. At least one counterbore in the pair of the counterbores, located on the upstream side with respect to the rotating direction of the brake disk, is formed in an oblong shape in section.

With this configuration, at the time of mounting the brake caliper to the vehicle body side support portion, the brake caliper is positioned in the arrangement direction of the mount holes (the arrangement direction of the counterbores) by the counterbores on the downstream side with respect to the rotating direction of the brake disk. An error in the inter-axial distance of the mount holes (the inter-axial distance of the counterbores) is absorbed by the counterbores on the upstream side with respect to the rotating direction of the brake disk.

According to an embodiment of the present invention, the brake caliper can be fixed accurately relative to the caliper bracket, without requiring fine adjustment. In addition, since the counterbore formed in the oblong sectional shape absorbs an error in the inter-axial distance of the counterbores, the tolerance of the inter-axial distance of the counterbores can be a general tolerance. Therefore, the brake caliper and the vehicle body side support portion can be manufactured efficiently.

According to an embodiment of the present invention, the positioning of the brake caliper in the direction orthogonal to the plane of the brake disk is particularly important in the case of the so-called radial mount type disk brake. Therefore, the effect of maintaining the positioning accuracy of the brake caliper is augmented.

In addition, while the overall length of the mount holes for the fastening bolt is enlarged in the case of the radial mount type disk brake, the embodiment of the present invention makes it sufficient to form only the counterbore in an oblong sectional shape. Therefore, the machining of the brake caliper and the vehicle body side support portion is facilitated, as compared with the case where the mount holes are formed in an oblong sectional shape over the entire length thereof.

According to an embodiment of the present invention, it is possible to eliminate the chattering of the brake caliper located on the downstream side with respect to the rotating direction of the brake disk, in the rotating direction of the brake disk. Therefore, a feeling of rigidity at the time of braking can be secured.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The present invention will now be described with reference to the accompanying drawings, wherein the same or similar elements have been identified by the same reference numeral throughout the several views. It should be noted that the sides or directions such as the front (forward), rear (rearward), left and right sides (directions) in the following description are the same as the sides or directions with respect to the vehicle.

Figure 1:
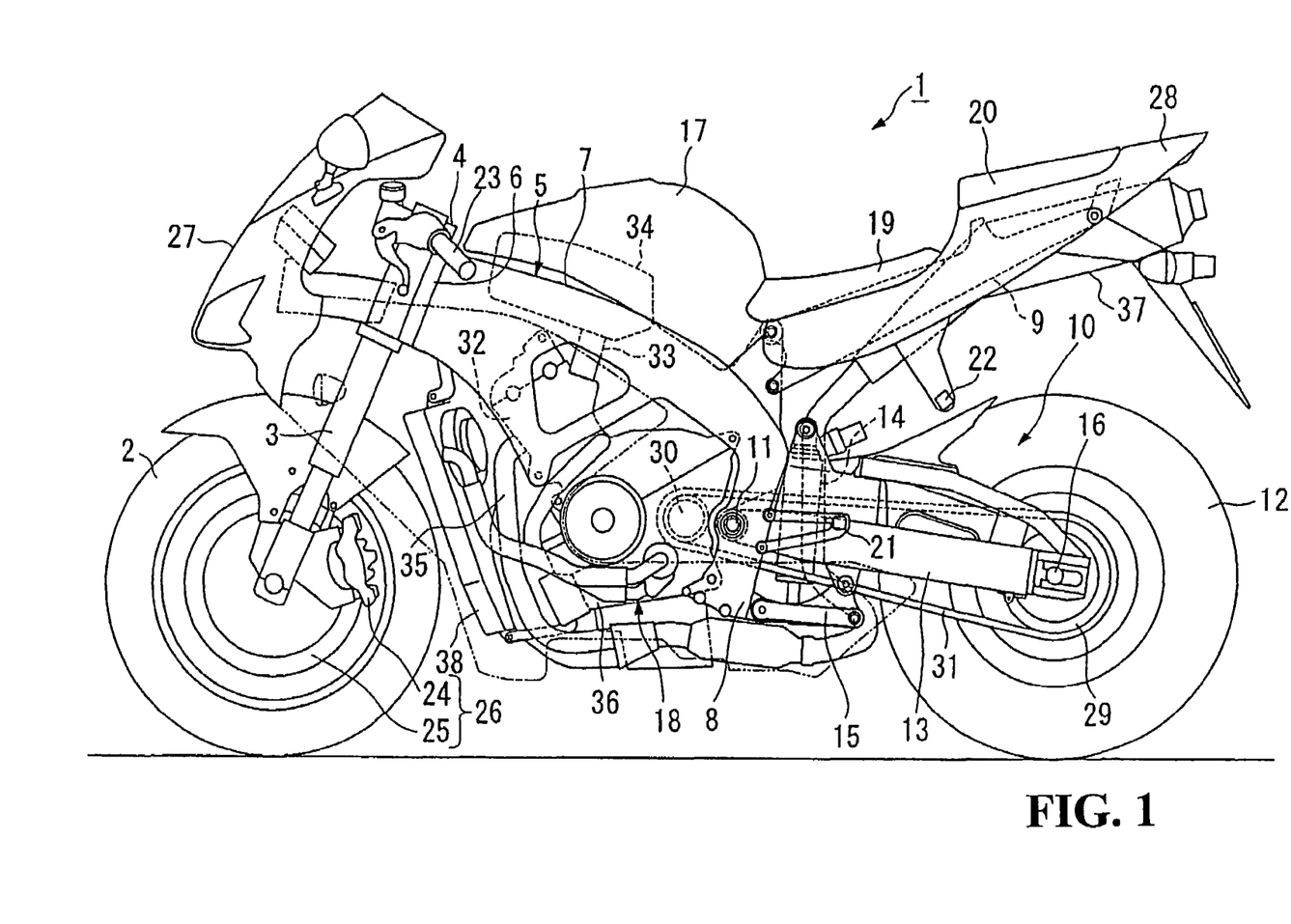
FIG. 1 is a side view, from the left side, of a motorcycle according to one embodiment of the present invention.

As shown in FIG. 1, a front fork 3 shaft-supporting a front wheel 2 of a motorcycle 1 is steerably supported on a head pipe 6 provided at a front end portion of a vehicle body frame 5 through a steering stem 4. A main frame 7 of the vehicle body frame 5 extends downwardly rearwards from the head pipe 6. Rear end portions of the main frame 7 are bent downwards, to be in continuity with pivot plates 8. In addition, a front end portion of a seat frame 9 extending upwardly rearwards is connected to a rear portion of the main frame 7.

A base end portion of a swing arm 13 is swingably mounted to the pivot plates 8 through a pivot shaft 11. A rear wheel 12 is shaft-supported on a tip end portion of the swing arm 13. An upper end portion of a cushion unit 14 is mounted to an upper portion on the base end side of the swing arm 13. Furthermore, a lower end portion of the cushion unit 14 is joined to the pivot plates 8 at a position lower than the pivot shaft 11 through a link mechanism 15.

A fuel tank 17 is mounted on the upper side of the main frame 7. A water cooled type four-cylinder engine 18 is mounted on the lower side of the main frame 7. In addition, a driver's seat 19 and a pillion seat 20 for a passenger are provided on the rear side of the fuel tank 17. Steps 21 for the driver are attached to rear portions of the pivot plates 8, while steps 22 for the passenger are attached to lower portions of the seat frame 9.

A steering handle 23 is mounted to an upper end portion of the front fork 3. In addition, brake calipers 24 are mounted to lower end portions of the front fork 3 through caliper brackets (vehicle body side support portions) 42. Brake disks 25 corresponding to the brake calipers 24 are mounted to hub portions of the front wheel 2, thereby constituting front disk brakes (disk brakes) 26 according to the present invention. In addition, a rear disk brake having the same configuration as that of the front disk brakes 26 is provided on the right side of the rear wheel 12.

A vehicle body front portion of the motorcycle 1 is covered with a front cowl 27, and the surroundings of the seat frame 9 are covered with a rear cowl 28. A rear sprocket 29 is mounted to the left side of the rear wheel 12. A drive chain 31 is wrapped around the rear sprocket 29 and a drive sprocket 30 disposed on the left side of a rear portion of the engine 18. Accordingly, the drive force of the engine 18 is transmitted to the rear wheel 12.

Throttle bodies 33 corresponding respectively to the cylinders are connected to rear portions of the cylinders 32 of the engine 18. Each of the throttle bodies 33 is connected to an air cleaner case 34 disposed between the main frame 7 and the fuel tank 17. Exhaust pipes 35 corresponding respectively to the cylinders are connected to front portions of the cylinders 32. The exhaust pipes 35 are bent downwards from front wall portions of the cylinders 32, pass under a crankcase 36, are then bent upwards on the rear side of the pivot plates 8, and are connected to a silencer 37 supported on the seat frame 9. A radiator 38 for cooling the engine 18 is disposed on the front side of the exhaust pipes 35.

Figure 2:
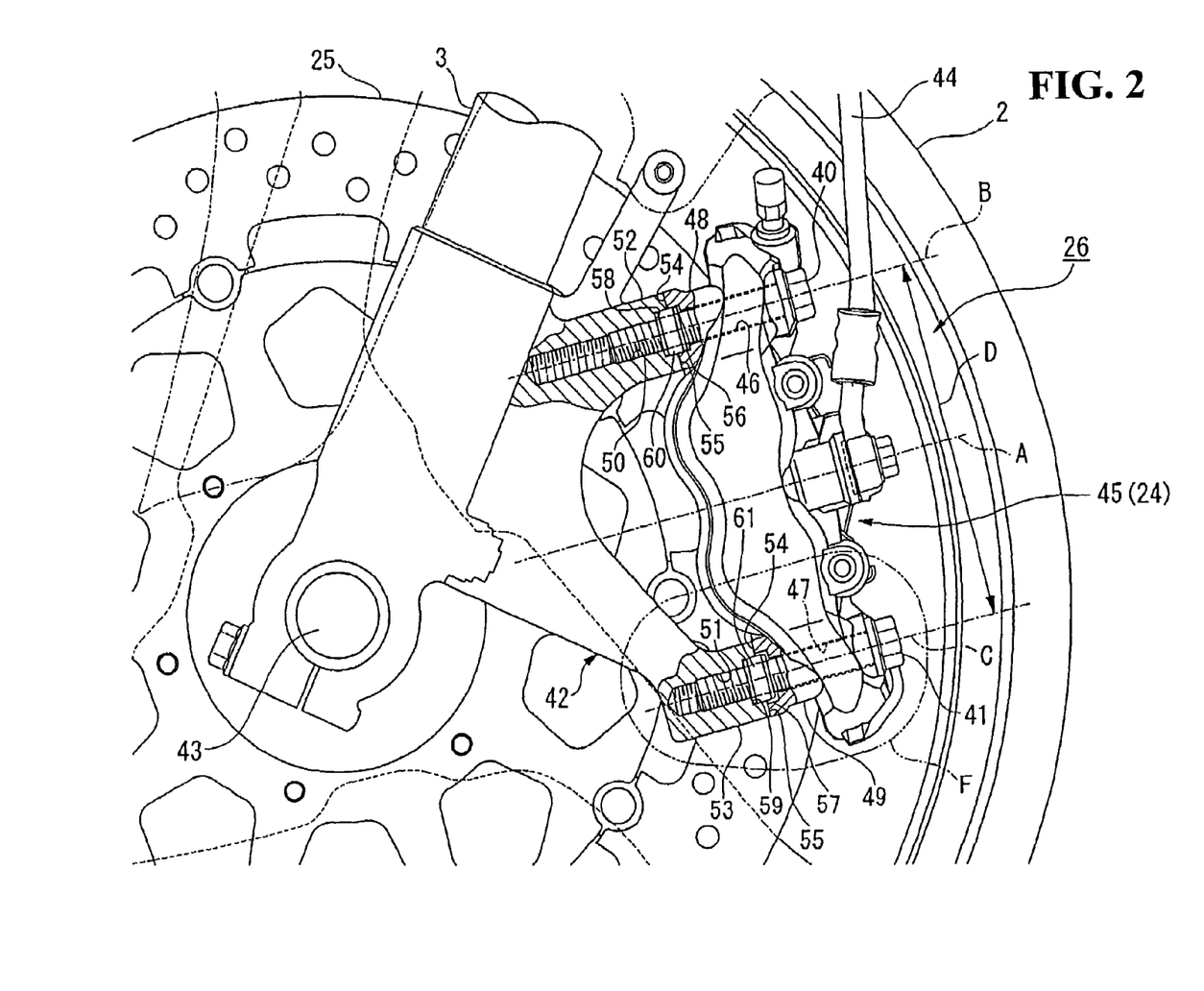
FIG. 2 is a side view of a front disk brake in the above motorcycle.

As shown in FIG. 2, the front disk brake 26 is of the so-called radial mount type in which the brake caliper 24 is fixed to the caliper bracket 42 by use of two fastening bolts 40, 41 disposed in parallel to the radial directions of the brake disk 25. The brake disk 25 is provided to be rotatable as one body with the front wheel 2 about a front axle 43. In addition, the caliper bracket 42 is disposed on the outer side in the width direction of the brake disk 25 (on the left side of the brake disk 25 in the case of the brake disk 25 provided on the left side of the front wheel 2), and is provided as one body with the lower end portion of the front fork 3. Hydraulic pressure generated in a master cylinder (omitted in the figure) is transmitted through brake hoses 44 to the brake calipers 24, whereby the rotation of the brake disks 25 and the front wheel 2 is braked.

Figure 3:
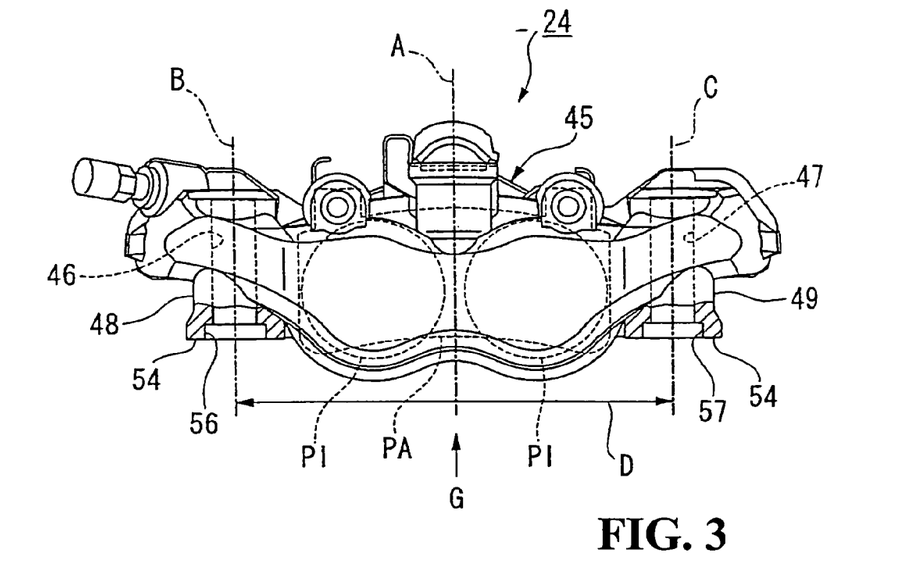
FIG. 3 is a side view of a brake caliper.
Figure 4:
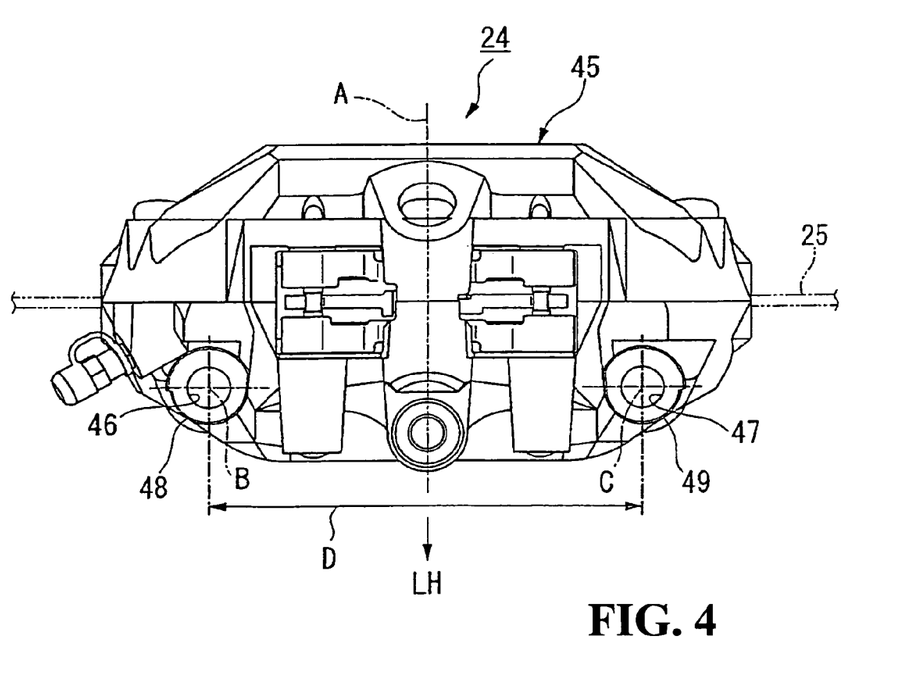
FIG. 4 is a plan view of the brake caliper.

Referring to FIGS. 3 and 4, the brake caliper 24 is of the so-called opposed piston type, including a caliper main body 45 provided astride the brake disk 25 on the outer side in the radial direction of the brake disk 25. A pair of brake pads PA (indicated by broken lines in FIG. 3 only) are disposed on both sides of the brake disk 25 and are supported on the caliper main body 45 so as to be movable in the direction orthogonal to the plane of the brake disk 25 (hereinafter referred to as the plane orthogonal direction). Pistons PI (indicated by broken lines in FIG. 3 only) are disposed respectively at positions on the opposite side of the brake disk of the brake pads and are fitted in cylinders formed in the caliper main body 45.

The brake caliper 24 is provided at its upper portion and lower portion with a pair of caliper side mount portions 48, 49 having bolt passing holes (mount holes) 46, 47 parallel to each other. On the other hand, the caliper bracket 42 is provided at its upper portion and lower portion with a pair of bracket side mount portions (support portion side mount portions) 52, 53 having screw holes (mount holes) 50, 51 provided with screw threads in the inner circumferences thereof (see FIG. 2). The caliper side mount portions 48, 49 and the bolt passing holes 46, 47 are arranged (arrayed) along the rotating direction of the brake disk 25. Similarly, the bracket side mount portions 52, 53 and the screw holes 50, 51 are arranged (arrayed) along the rotating direction of the brake disk 25.

The fastening bolts 40, 41 are passed through the bolt passing holes 46, 47 from the side of the brake caliper 24 and are fastened into the screw holes 50, 51, whereby the brake caliper 24 is fixed to the caliper bracket 42. The bolt passing holes 46, 47 and the screw holes 50, 51 are so disposed that they are at equal pitches from the center position (indicated by dot-dash line A in the figures) of the brake caliper 24 in the circumferential direction of the brake disk 25. Incidentally, the center position is located on a diameter of the brake disk 25 in side view of the vehicle body. In addition, the bolt passing holes 46, 47 and the screw holes 50, 51 are provided on the outer side in the vehicle width direction (the side pointed by arrow LH in FIG. 4) of the brake disk 25 correspondingly to the caliper bracket 42.

As shown in FIG. 2, at the time of fixing the brake caliper 24 to the caliper bracket 42, each of the upper and lower sets of the caliper side mount portions 48, 49 and the bracket side mount portions 52, 53 abut each other on a plane orthogonal to the axes B, C of the bolt passing holes 46, 47 and the screw holes 50, 51, whereby the brake caliper 24 is positioned in the radial direction of the brake disk 25. The abutting surfaces of the brake caliper 24 are referred to as caliper side opposed surfaces (opposed surfaces) 54, and the abutting surfaces of the caliper bracket 42 are referred to as bracket side opposed surfaces (opposed surfaces) 55. In addition, the distance between the axes B, C of the bolt passing holes 46, 47 and the screw holes 50, 51 (the inter-axial distance of the bolt passing holes 46, 47 and the screw holes 50, 51) is denoted by D.

The brake caliper 24 is mounted to the caliper bracket 42 from the upper rear side. The opposed surfaces 54, 55 are so inclined that they are located on the front side as one goes upwards. The axes B, C of the bolt passing holes 46, 47 and the screw holes 50, 51 are so inclined that they are located on the upper side as one goes rearwards. The caliper side mount portion 49 and the bracket side mount portion 53 on the lower side are located on the rear side relative to those on the upper side.

Figure 5:
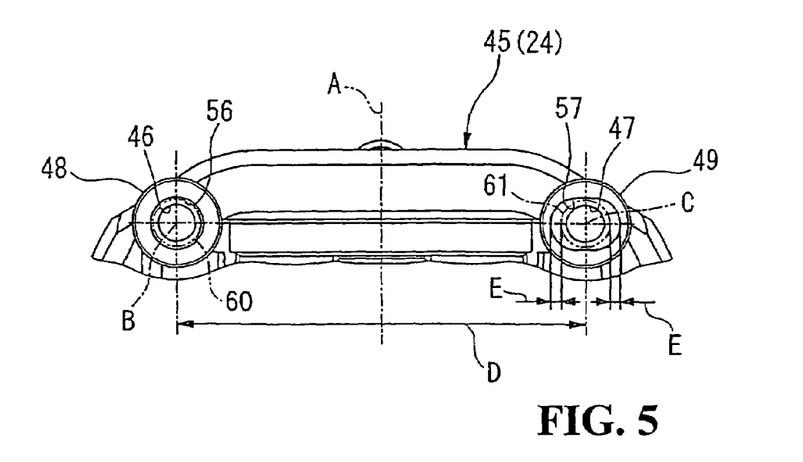
FIG. 5 is a bottom view of the brake caliper, as viewed along arrow G of FIG. 3.

The upper and lower bolt passing holes 46, 47 are provided at their portions on the side of the caliper side opposed surfaces 54 with an upper-side counterbore (counterbore) 56 and a lower-side counterbore (counterbore) 57, respectively, which are formed by displacing the caliper side opposed surfaces 54 in the surroundings of the openings thereof in the direction away from the bracket side opposed surfaces 55 (see FIGS. 3 and 5). In addition, the upper and lower screw holes 50, 51 are provided at their portions on the side of the bracket side opposed surfaces 55 with an upper-side counterbore (counterbore) 58 and a lower-side counterbore (counterbore) 59, respectively, which are formed by displacing the bracket side opposed surfaces 55 in the surroundings of the openings thereof in the direction away from the caliper side opposed surfaces 54.

The upper-side counterbore 56 and the lower-side counterbore 57 are arranged along the rotating direction of the brake disk 25. Similarly, the upper-side counterbore 58 and the lower-side counterbore 59 are arranged along the rotating direction of the brake disk 25.

A collar member 60 is fitted in the upper-side counterbores 56, 58 so as to extend from one to the other of the counterbores 56, 58, and the upper-side fastening bolt 40 penetrates through the inside of the collar member 60. Similarly, a collar member 61 is fitted in the lower-side counterbores 57, 59 so as to extend from one to the other of the counterbores 57, 59, and the lower-side fastening bolt 41 penetrates through the inside of the collar member 61.

The upper-side counterbores 56, 58 and the lower-side counterbores 57, 59 are formed simultaneously with the machining of the corresponding bolt passing holes 46, 47 or screw holes 50, 51 by use of, for example, a step drill or the like. Therefore, the tolerance of the inter-axial distance D of the bolt passing holes 46, 47 in the upper and lower caliper side mount portions 48, 49 and the tolerance of the inter-axial distance of the upper-side and lower-side counterbores 56, 57 corresponding to the bolt passing holes 46, 47 are roughly equal to each other. Similarly, the tolerance of the inter-axial distance D of the screw holes 50, 51 in the upper and lower bracket side mount portions 52, 53 and the tolerance of the inter-axial distance of the upper-side and lower-side counterbores 58, 59 corresponding to the screw holes 50, 51 are roughly equal to each other.

The upper-side counterbores 56, 58 located on the downstream side with respect to the rotating direction of the brake disk 25 are formed in a true circular sectional shape having the axis B in common with the upper-side bolt passing hole 46 and screw hole 50, and the inner circumferential surfaces thereof match the outer circumferential surface of the collar member 60. On the other hand, as for the lower-side counterbores 57, 59 located on the upstream side with respect to the rotating direction of the brake disk 25, the lower-side counterbore 59 formed in the bracket side mount portion 53 is formed in a true circular sectional shape having the axis C in common with the bolt passing hole 47 and the screw hole 51, whereas the lower-side counterbore 57 formed in the caliper side mount portion 49 is formed in an oblong sectional shape which has its center on the axis C of the bolt passing hole 47 (and the screw hole 51) and which is elongate along the arrangement direction (the pitch direction) of both the bolt passing holes 46, 47 (see FIG. 5).

Figure 6:
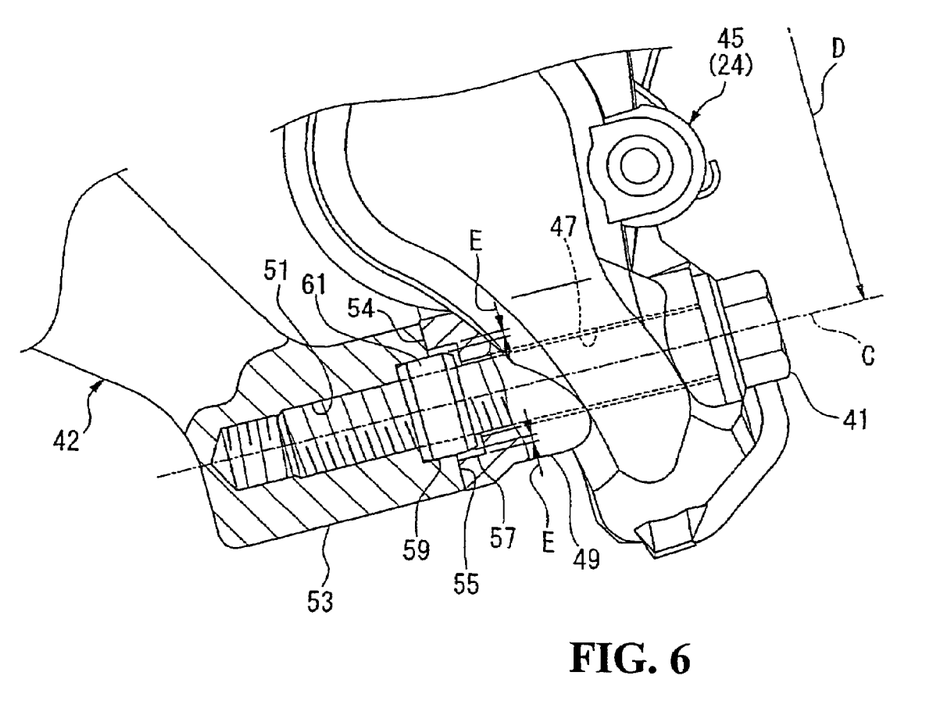
FIG. 6 is a side view of an essential part, obtained by enlarging part F of FIG. 2.

As shown in FIG. 6, the inner circumferential surface of the lower-side counterbore 59 in the bracket side mount portion 53 match the outer circumferential surface of the collar member 61. The width in the transverse direction of the inner circumferential surface of the lower-side counterbore 57 in the caliper side mount portion 49 is roughly equal to the outside diameter of the collar member 61. However, the width in the longitudinal direction is equal to a value obtained by adding, to the outside diameter of the collar member 61, error portions E, E determined by taking into account the general tolerance of the inter-axial distance D of both the bolt passing holes 46, 47 (namely, the general tolerance of the inter-axial distance of the upper-side and lower-side counterbores 56, 57) and the general tolerance of the inter-axial distance D of both the screw holes 50, 51 (namely, the general tolerance of the inter-axial distance of the upper-side and lower-side counterbores 58, 59) (see FIG. 5). Incidentally, the inner circumferential surfaces on both end sides in the longitudinal direction of the lower-side counterbore 57 are halves of a hollow cylindrical surface, which match the outer circumferential surface of the collar member 61.

In the condition where the collar members 60, 61 are fitted respectively in the upper-side counterbores 56, 58 and in the lower-side counterbores 57, 59 and the brake caliper 24 is mounted to the caliper bracket 42, the lower-side collar member 61 is located at the center in the longitudinal direction of the lower-side counterbore 57 in the caliper side mount portion 49.

According to the above-described embodiment, as shown in FIG. 2, the front disk brake 26 includes the brake caliper 24 having the pistons PI and the brake pads PA for pressing the brake disk 25. The caliper bracket 42 is provided on the vehicle body side for supporting the brake caliper 24. The brake caliper 24 is provided with the pair of caliper side mount portions 48, 49. The caliper bracket 42 is provided with the pair of bracket side mount portions 52, 53 corresponding to the caliper side mount portions 48, 49. The caliper side opposed surfaces 54 of the caliper side mount portions 48, 49 and the bracket side opposed surfaces 55 of the bracket side mount portions 52, 53 are made to abut each other. The fastening bolts 40, 41 are mounted in the bolt passing holes 46, 47 and the screw holes 50, 51 formed in the mount portions 48, 49, 52, 53. Accordingly, the brake caliper 24 is fixed to the caliper bracket 42.

The bolt passing holes 46, 47 in the caliper side mount portions 48, 49 are provided respectively with the upper-side and lower-side counterbores 56, 57 at their portions on the side of the caliper side opposed surfaces 54. The screw holes 50, 51 in the bracket side counterbores 52, 53 are provided respectively with the upper-side and lower-side counterbores 58, 59 at their portions on the side of the bracket side opposed surfaces 55. The collar member 60 is fitted in the opposed set of the upper-side counterbores 56, 58 so as to extend from one to the other of the upper-side counterbores 56, 58. The collar member 61 is fitted in the opposed set of the lower-side counterbores 57, 59 so as to extend from one to the other of the lower-side counterbores 57, 59.

At the time of mounting the brake caliper 24 to the caliper bracket 42, the brake caliper 24 is positioned relative to the caliper bracket 42 in the direction orthogonal to the plane of the brake disk 25 by only fitting the collar members 60, 61 respectively in the sets of the upper-side and lower-side counterbores 56, 57, 58, 59. In addition, the brake caliper 24 is necessarily positioned relative to the caliper bracket 42 in the radial direction of the brake disk 25 by the mutual abutting of the caliper side opposed surfaces 54 and the bracket side opposed surfaces 55. This ensures that the brake caliper 24 is fixed to the caliper bracket 42 accurately, without requiring fine adjustment.

The lower-side counterbore 57 formed in the caliper side mount portion 49 is formed in an oblong sectional shape, which is elongate along the arrangement direction of the lower-side counterbore 57 and the upper-side counterbore 56 paired therewith. Specifically, the width in the transverse direction of the inner circumferential surface of the lower-side counterbore 57 is roughly equal to the outside diameter of the collar member 61. However, the width in the longitudinal direction is equal to a value determined by adding, to the outside diameter of the collar member 61, the error portions determined by taking into account the general tolerances of the inter-axial directions of both the bolt passing holes 46, 47 and both the screw holes 50, 51.

Thus, at least one counterbore (the lower-side counterbore 57 in the caliper side mount portion 49) is formed in an oblong sectional shape elongate in the arrangement direction of itself and the counterbore (the upper-side counterbore 56 in the caliper side mount portion 48) paired therewith. This ensures that even when errors are generated respectively in the inter-axial distance of the upper-side and lower-side counterbores 56, 57 in the caliper side mount portions 48, 49 and in the inter-axial distance of the upper-side and lower-side counterbores 58, 59 in the bracket side mount portions 52, 53, the errors can be absorbed by the counterbore formed in an oblong sectional shape. Therefore, the mounting of the brake caliper 24 is not hampered, and the positioning accuracy can be maintained.

Therefore, the tolerances of the inter-axial distances of the paired upper-side counterbores 56, 58 and the lower-side counterbores 57, 59 can be general tolerances, so that the brake caliper 24 and the vehicle body side support portion can be manufactured efficiently.

In addition, at the time of mounting the brake caliper 24 to the caliper bracket 42, positioning of the brake caliper 24 in the arrangement direction of the upper-side counterbores 56, 58 and the lower-side counterbores 57, 59 is achieved by the upper-side counterbores 56, 58 located on the downstream side with respect to the rotating direction of the brake disk 25. Errors in the inter-axial distances of the upper-side counterbores 56, 58 and the lower-side counterbores 57, 59 are absorbed by the lower-side counterbores 57, 59 located on the upstream side with respect to the rotating direction of the brake disk 25. Therefore, it is possible to eliminate chattering of the brake caliper 24 in the rotating direction of the brake disk 25 due to the setting of the counterbore formed in the oblong sectional shape, to restrain the mounting rigidity of the brake caliper 24 from being lowered, and to secure a feeling of rigidity at the time of braking.

The configuration in which the portion(s) to be formed in an oblong sectional shape is only the lower-side counterbore 57 makes it possible to enhance the manufacturability of the brake caliper 24, as compared with the case where the bolt passing hole 47 is formed in an oblong sectional shape over the entire length thereof in the radial mount type front disk brake 26 in which the entire length of the bolt passing hole 47 is large. In addition, in the radial mount type front disk brake 26, the positioning of the brake caliper 24 in the direction orthogonal to the plane of the brake disk 25 is important and, therefore, the effect of the maintaining the positioning accuracy of the brake caliper 24 is great.

Incidentally, the present invention is not limited to the above-described embodiment. For example, there may be adopted a configuration in which the brake caliper 24 is provided with the screw holes 50, 51, while the caliper bracket 42 is provided with the bolt passing holes 46, 47, and the fastening bolts 40, 41 are mounted in position from the side of the caliper bracket 42. In addition, a disk brake with a configuration in which the brake caliper is mounted to the vehicle body side support portion by fastening bolts disposed in parallel to the plane orthogonal direction of the brake disk 25 may be adopted, instead of the radial mount type disk brake.

Furthermore, the disk brake may be a floating (pin slide) type disk brake, instead of the opposed piston type disk brake. Specifically, the disk brake may be a disk brake in which a brake caliper including a caliper main body having a piston and a brake pad for pressing one side surface of a brake disk, and a reaction portion having a brake pad for pressing the other side surface of the brake disk, is fixed to a caliper bracket though a caliper support by fastening bolts penetrating through the brake caliper itself. In this case, the caliper support interposed between the brake caliper and the caliper bracket belongs to the brake caliper side.

The same functions or effects as those of the above-described embodiment can be obtained in the case where the brake caliper is provided with at least two mount holes for passing the fastening bolts therethrough. One of the mount holes is formed in a true circular sectional shape, and at least one of the other mount hole(s) is formed in an oblong sectional shape elongate in the arrangement direction of this mount hole and the mount hole formed in the true circular sectional shape. In addition, in this form of disk brake, it is possible to adopt the so-called radial mount type in which each of the fastening bolts is disposed in parallel to the radial direction of the brake disk.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A disk brake comprising:
    a brake caliper having pistons and brake pads for pressing a brake disk, said brake caliper being provided with a pair of caliper side mount portions; and
    a vehicle body side support portion provided on a vehicle body side for supporting said brake caliper, said vehicle body side support portion being provided with a pair of support portion side mount portions corresponding to said caliper side mount portions,
    wherein opposed surfaces of said mount portions directly abut each other, fastening bolts are mounted in mount holes formed in said mount portions to fix said brake caliper to said vehicle body side support portion,
    said fastening bolts being disposed on opposite sides of a line A extending outwardly in a radial direction from a center of the brake disk,
    each of said mount holes is provided with a counterbore on the opposed surface side thereof,
    a collar member extending from one to the other of each opposed set of said counterbores is fitted in said opposed set of said counterbores, wherein each of said counterbores formed in said support portion side mount portions is formed with a circular sectional shape, and one of said counterbores formed in said pair of caliper side mount portions is formed in said oblong sectional shape,
    wherein said counterbore that is formed in an oblong sectional shape is elongate in an arrangement direction of said at least one counterbore and said counterbore paired therewith,
    the arrangement direction being orthogonal to the direction of the line A extending outwardly in the radial direction from the center of the brake disk.

2. The disk brake according to claim 1, wherein said counterbores provided at each pair of said caliper side mount portions and said counterbores provided at each pair of support portion side mount portions are respectively arranged in the rotating direction of said brake disk, and at least one counterbore of the pair of counterbores located on the upstream side with respect to said rotating direction of said brake disk is formed in the oblong sectional shape.

3. The disk brake according to claim 1, wherein said mount holes formed in said pair of support portion side mount portions have threads formed therein for cooperating with said fastening bolts, and said mount holes formed in said pair of caliper side mount portions are unthreaded.

4. The disk brake according to claim 1, wherein said mount holes formed in said caliper side mount portions and said support portion side mount portions are arrayed along the rotation direction of said brake disk, said mount holes being located at equal pitches from and parallel to a diameter of the brake disk.

5. The disk brake according to claim 1, wherein said counterbore formed in the oblong sectional shape has a transverse width generally equal to a diameter of said collar member and a longitudinal width generally equal to the diameter of said collar member plus a tolerance error, said tolerance error taking into account a general tolerance of an inter-axial distance of said mount holes.

6. A disk brake comprising:
    a brake caliper, said brake caliper being provided with a pair of caliper side mount portions; and
    a vehicle body side support portion provided on a vehicle body side for supporting said brake caliper, said vehicle body side support portion being provided with a pair of support portion side mount portions corresponding to said caliper side mount portions,
    wherein opposed surfaces of said pair of caliper side mount portions and said pair of support portion side mount portions respectively directly abut each other,
    fastening bolts are mounted in mount holes formed in each of said pair of caliper side mount portions and said pair of support portion side mount portions to fix said brake caliper to said vehicle body side support portion,
    said fastening bolts being disposed on opposite sides of a line A extending outwardly in a radial direction from a center of the brake disk,
    said pair of caliper side mount holes and said pair of support portion side mount holes are provided with counterbores to form two pair of opposed counterbores, and
    at least one counterbore of said pair of caliper side mount portions is formed in an oblong sectional shape, the oblong sectional shape having an elongate dimension that is orthogonal to the direction of the line A extending outwardly in the radial direction from the center of the brake disk,
    wherein each of said counterbores formed in said support portion side mount portions is formed with a circular sectional shape.

7. The disk brake according to claim 1, further comprising a collar member fitted in said at least one pair of opposed counterbores, said collar member extending from one to the other of said opposed counterbores.

8. The disk brake according to claim 6, wherein there are two pairs of said at least one pair of opposed counterbores arranged in the rotating direction of said brake disk, and at least one counterbore of the pair of opposed counterbores located on the upstream side with respect to said rotating direction of said brake disk is formed in the oblong sectional shape.

9. The disk brake according to claim 6, wherein said mount holes formed in said pair of support portion side mount portions have threads formed therein for cooperating with said fastening bolts, and said mount holes formed in said pair of caliper side mount portions are unthreaded.

10. The disk brake according to claim 6, wherein said mount holes formed in said caliper side mount portions and said support portion side mount portions are arrayed along the rotation direction of said brake disk, said mount holes being located at equal pitches from and parallel to a diameter of the brake disk.

11. The disk brake according to claim 6, wherein said counterbore formed in the oblong sectional shape has a transverse width generally equal to a diameter of said collar member and a longitudinal width generally equal to the diameter of said collar member plus a tolerance error, said tolerance error taking into account a general tolerance of an inter-axial distance of said mount holes.

12. A brake caliper, comprising:
pistons and brake pads for pressing a brake disk; and
first and second vehicle body side support portions;
first and second caliper side mount portions, each of which includes a passing hole for accommodating a fastening bolt,
wherein said fastening bolts are disposed on opposite sides of a line A extending outwardly in a radial direction from a center of the brake disk,
said passing holes of the first and second caliper side mount portions are provided, respectively, with first and second counterbores, each of the first and second counterbores for accommodating a collar member, and
wherein the first counterbore is formed in an oblong sectional shape elongate in an arrangement direction, and the second counterbore is formed with a circular shape,
the arrangement direction being a direction of a line between centers of the first and the second counterbores, which is orthogonal to a direction of the line A extending outwardly in the radial direction from the center of the brake disk, and
further comprising:
third and fourth circular-shaped counterbores provided, respectively, in the first and second vehicle body side support portions,
wherein the third circular-shaped counterbore faces the oblong-sectional-shaped first counterbore of first caliper side mount portion, and the fourth circular-shaped counterbore faces the circular-shaped second counterbore of the caliper side mount portion.

13. The disk brake according to claim 12, wherein said counterbores provided at said caliper side mount portions are respectively arranged in the rotating direction of said brake disk, and the counterbore located on the upstream side with respect to said rotating direction of said brake disk is formed in the oblong sectional shape.

14. The disk brake according to claim 12, wherein said passing holes formed in said caliper side mount portions are unthreaded.

15. The disk brake according to claim 12, wherein said passing holes formed in said caliper side mount portions are arrayed along the rotation direction of said brake disk, said passing holes being located at equal pitches from and parallel to a diameter of the brake disk.

16. The disk brake according to claim 12, wherein said counterbore formed in the oblong sectional shape has a transverse width generally equal to a diameter of said collar member and a longitudinal width generally equal to the diameter of said collar member plus a tolerance error, said tolerance error taking into account a general tolerance of an inter-axial distance of said passing holes.

17. The disk brake according to claim 1, wherein the at least one of the counterbores formed with the oblong sectional shape is an oblong-shaped counterbore provided at an inner end of the mounting hole formed in the brake caliper.

18. The disk brake according to claim 1, wherein the at least one of the counterbores formed with the oblong sectional shape is an oblong-shaped counterbore provided in the brake caliper, the oblong-shaped counterbore being disposed in a position facing one of the counterbores provided in the vehicle body side support portion.

19. A disk brake comprising:
a brake caliper having pistons and brake pads for pressing a brake disk, said brake caliper being provided with a pair of caliper side mount portions; and
a vehicle body side support portion provided on a vehicle body side for supporting said brake caliper, said vehicle body side support portion being provided with a pair of support portion side mount portions corresponding to said caliper side mount portions,
wherein opposed surfaces of said mount portions directly abut each other, fastening bolts are mounted in mount holes formed in said mount portions to fix said brake caliper to said vehicle body side support portion,
said fastening bolts being disposed on opposite sides of a line A extending outwardly in a radial direction from a center of the brake disk,
each of said mount holes is provided with a counterbore on the opposed surface side thereof,
a collar member extending from one to the other of each opposed set of said counterbores is fitted in said opposed set of said counterbores, and at least one of said counterbores is formed in an oblong sectional shape elongate in an arrangement direction of said at least one counterbore and said counterbore paired therewith,
the arrangement direction being orthogonal to the direction of the line A extending outwardly in the radial direction from the center of the brake disk,wherein the counterbores provided in the vehicle body side support portion are circular in shape, at least one of which faces the at least one of the counterbores having the oblong sectional shape.

20. The disk brake according to claim 6, wherein the at least one of said pair of opposed counterbores formed with the oblong sectional shape is an oblong-shaped counterbore provided at an inner end of the mounting hole formed in the brake caliper.

21. The disk brake according to claim 6, wherein the at least one of said pair of opposed counterbores formed with the oblong sectional shape is an oblong-shaped counterbore provided in the brake caliper, the oblong-shaped counterbore being disposed in a position opposing one of the counterbores provided in the vehicle body side support portion.

22. A disk brake comprising:
a brake caliper, said brake caliper being provided with a pair of caliper side mount portions; and
a vehicle body side support portion provided on a vehicle body side for supporting said brake caliper, said vehicle body side support portion being provided with a pair of support portion side mount portions corresponding to said caliper side mount portions,
wherein opposed surfaces of said pair of caliper side mount portions and said pair of support portion side mount portions respectively directly abut each other,
fastening bolts are mounted in mount holes formed in each of said pair of caliper side mount portions and said pair of support portion side mount portions to fix said brake caliper to said vehicle body side support portion,
said fastening bolts being disposed on opposite sides of a line A extending outwardly in a radial direction from a center of the brake disk, at least one of said caliper side mount holes and at least one of said support portion side mount holes is provided with a counterbore to form at least one pair of opposed counterbores, and at least one of said pair of opposed counterbores is formed in an oblong sectional shape, the arrangement direction being orthogonal to the direction of the line A extending outwardly in the radial direction from the center of the brake disk, wherein the counterbores provided in the vehicle body side support portion are circular in shape, at least one of which opposes the at least one of said pair of opposed counterbores having the oblong sectional shape.

23. The disk brake according to claim 12, wherein the at least one of the counterbores formed with the oblong sectional shape is an oblong-shaped counterbore provided at an inner end of the mounting hole formed in the brake caliper.

24. The disk brake according to claim 1, wherein said fastening bolts are disposed on opposite sides of the line A are parallel to and equidistant from the line A.

25. The disk brake according to claim 6, wherein said fastening bolts are disposed on opposite sides of the line A are parallel to and equidistant from the line A.

26. The disk brake according to claim 12, wherein said fastening bolts are disposed on opposite sides of the line A are parallel to and equidistant from the line A.

\* \* \* \* \*